United States Patent

Vilc et al.

(10) Patent No.: US 9,589,733 B2
(45) Date of Patent: Mar. 7, 2017

(54) STABLE SOLID ELECTROLYTIC CAPACITOR CONTAINING A NANOCOMPOSITE

(71) Applicant: AVX Corporation, Fountain Inn, SC (US)

(72) Inventors: Ladislav Vilc, Lanskroun (CZ); Irena Pfitznerova, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 322 days.

(21) Appl. No.: 14/108,726

(22) Filed: Dec. 17, 2013

(65) Prior Publication Data

US 2015/0170844 A1 Jun. 18, 2015

(51) Int. Cl.
| | |
|---|---|
| H01G 9/02 | (2006.01) |
| H01G 9/025 | (2006.01) |
| H01G 9/00 | (2006.01) |
| H01G 9/042 | (2006.01) |
| H01G 9/15 | (2006.01) |

(52) U.S. Cl.
CPC ........... *H01G 9/025* (2013.01); *H01G 9/0036* (2013.01); *H01G 9/042* (2013.01); *H01G 9/15* (2013.01)

(58) Field of Classification Search
USPC ......................................... 361/523, 525–526
See application file for complete search history.

(56) References Cited

U.S. PATENT DOCUMENTS

| | | | |
|---|---|---|---|
| 4,910,645 A | 3/1990 | Jonas et al. | |
| 5,424,907 A | 6/1995 | Kojima et al. | |
| 5,457,862 A | 10/1995 | Sakata et al. | |
| 5,473,503 A | 12/1995 | Sakata et al. | |
| 5,586,000 A | 12/1996 | Sakata et al. | |
| 5,694,287 A | 12/1997 | Nishiyama et al. | |
| 5,729,428 A | 3/1998 | Sakata et al. | |
| 5,812,367 A | 9/1998 | Kudoh et al. | |
| 6,528,662 B2 | 3/2003 | Jonas | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,798,644 B1 | 9/2004 | Piller et al. | |

(Continued)

FOREIGN PATENT DOCUMENTS

| | | |
|---|---|---|
| JP | 2003168633 A * | 6/2003 |
| JP | 2004168966 A * | 6/2004 |

(Continued)

OTHER PUBLICATIONS

Abstract of Japanese Patent—JP2001257130, Sep. 21, 2001, 2 pages.

(Continued)

*Primary Examiner* — Eric Thomas
(74) *Attorney, Agent, or Firm* — Dority & Manning, P.A.

(57) ABSTRACT

A solid electrolytic capacitor that includes an anode body, dielectric overlying the anode body, and solid electrolyte that overlies the dielectric is provided. The solid electrolyte includes a nanocomposite that contains a plurality of nanofibrils dispersed within a conductive polymer matrix. The nanofibrils have a relatively small size and high aspect ratio, which the present inventors have discovered can dramatically improve the thermal-mechanical stability and robustness of the resulting capacitor.

18 Claims, 1 Drawing Sheet

(56) References Cited

U.S. PATENT DOCUMENTS

| | | |
|---|---|---|
| 6,853,540 B2 | 2/2005 | Kudoh et al. |
| 6,987,663 B2 | 1/2006 | Merker et al. |
| 7,154,740 B2 | 12/2006 | Merker et al. |
| 7,180,728 B2 | 2/2007 | Kobayashi |
| 7,221,554 B2 | 5/2007 | Brenneman et al. |
| 7,248,461 B2 | 7/2007 | Takagi et al. |
| 7,262,511 B2 | 8/2007 | Osako et al. |
| 7,279,015 B2 | 10/2007 | Merker |
| 7,377,947 B2 | 5/2008 | Merker et al. |
| 7,411,779 B2 | 8/2008 | Merker et al. |
| 7,515,396 B2 | 4/2009 | Biler |
| 7,554,793 B2 | 6/2009 | Chacko |
| 7,563,290 B2 | 7/2009 | Qiu et al. |
| 7,585,983 B2 | 9/2009 | Reuter et al. |
| 7,785,493 B2 | 8/2010 | Jonas et al. |
| 7,800,887 B2 | 9/2010 | Iida et al. |
| 7,821,772 B2 | 10/2010 | Kobayashi et al. |
| 7,990,683 B2 | 8/2011 | Qiu et al. |
| 8,035,953 B2 | 10/2011 | Nemoto et al. |
| 8,050,014 B2 | 11/2011 | Iwasa et al. |
| 8,057,553 B2 | 11/2011 | Iwasa et al. |
| 8,058,135 B2 | 11/2011 | Merker et al. |
| 8,094,434 B2 | 1/2012 | Rawal et al. |
| 8,194,395 B2 | 6/2012 | Zednicek et al. |
| 8,228,664 B2 | 7/2012 | Yamaguchi et al. |
| 8,279,584 B2 | 10/2012 | Zednickova |
| 8,308,825 B2 | 11/2012 | Freeman et al. |
| 8,310,815 B2 | 11/2012 | Freeman et al. |
| 8,313,538 B2 | 11/2012 | Merker et al. |
| 8,323,361 B2 | 12/2012 | Freeman et al. |
| 8,349,030 B1 | 1/2013 | Hussey et al. |
| 8,422,201 B2 | 4/2013 | Harada et al. |
| 8,437,117 B2 | 5/2013 | Umemoto et al. |
| 8,456,803 B2 | 6/2013 | Merker et al. |
| 8,470,389 B2 | 6/2013 | Furukawa et al. |
| 8,503,167 B2 | 8/2013 | Ota et al. |
| 2007/0171596 A1* | 7/2007 | Chacko .............. H01G 9/012 361/523 |
| 2010/0157510 A1 | 6/2010 | Miyachi et al. |
| 2010/0172068 A1 | 7/2010 | Yoshimitsu |
| 2011/0019339 A1 | 1/2011 | Merker et al. |
| 2012/0057275 A1 | 3/2012 | Intelmann et al. |
| 2012/0063063 A1 | 3/2012 | Qiu et al. |
| 2012/0097897 A1 | 4/2012 | Guntermann et al. |
| 2012/0106031 A1 | 5/2012 | Vilc et al. |
| 2012/0134074 A1 | 5/2012 | Abe et al. |
| 2013/0261261 A1 | 10/2013 | Lövenich |
| 2013/0295389 A1 | 11/2013 | Ishikawa et al. |

FOREIGN PATENT DOCUMENTS

| | | | |
|---|---|---|---|
| JP | 2005085947 A | * | 3/2005 |
| JP | 2008235771 A | * | 10/2008 |
| JP | 2011178878 A | * | 9/2011 |
| WO | WO 2012/041506 A2 | | 4/2012 |
| WO | WO 2012/041506 A3 | | 4/2012 |
| WO | WO 2012/048824 A1 | | 4/2012 |
| WO | WO 2012/119711 A1 | | 9/2012 |
| WO | WO 2012/136305 A1 | | 10/2012 |

OTHER PUBLICATIONS

Abstract of Japanese Patent—JP2010090397, Apr. 22, 2010, 1 page.
Abstract of Japanese Patent—JPH01140621, Jun. 1, 1989, 1 page.
Abstract of Japanese Patent—JPH03109712, May 9, 1991, 2 pages.
Abstract of Japanese Patent—JPH03109713, May 9, 1991, 2 pages.
Abstract of Japanese Patent—JPH03109714, May 9, 1991, 2 pages.
Abstract of Japanese Patent—JPH03127813, May 30, 1991, 1 page.
Abstract of WO Patent—WO2010015468, Feb. 11, 2010, 1 page.
Product Information on Nanocyl™ NC7000 Series—Thin Multi-Wall Carbon Nanotubes from Nanocyl S.A., Mar. 10, 2009, 1 page.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages and CARTS Europe 2008, Helsinki, Finland, Oct. 20-23, 2008.
Paper—Freeman et al., "How Far We Can Go with Hi CV Ta Capacitors," CARTS Europe 2004, $18^{th}$ Annual Passive Components Conference, Oct. 18-21, 2004.
Paper—Freeman et al, "How High Working Voltage Can Go in Polymer Tantalum Capacitors," CARTS USA 2011, Jacksonville, Florida, Mar. 28-31, 2011, 15 pages.
Paper—Freeman et al., "Low Voltage CV Loss in Tantalum Capacitors," CARTS USA 2010, New Orleans, LA, Mar. 16, 2010, 12 pages.
Paper—Freeman et al., "Reliability and Critical Applications of Tantalum Capacitors," CARTS Europe 2007 Symposium, Oct.-Nov. 2007, Barcelona, Spain, pp. 193-204.
Paper —Freeman et al., "Stable, Reliable, and Efficient Tantalum Capacitors," CARTS USA 2008, $28^{th}$ Symposium, for Passive Electronics, March, Newport Beach, California, 6 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Petrzilek et al., "Next Generation of High Voltage, Low ESR Tantalum Conductive Polymer Capacitors," *CARTS USA* 2011, Jacksonville, Florida, Mar. 28-31, 2011, 9 pages.
Paper—Simpson et al., "Advances and Applications of Inherently Conductive Polymer Technologies Based on Poly(3,4-Ethylenedioxythiophene)," 2005 AIMCAL Fall Technical Conference and $19^{th}$ International Vacuum Web Coating Conference, Oct. 16-20, 2005, Session 5: Advances in Technology, Myrtle Beach, SC, 10 pages.
Paper—Young et al., "High Voltage Tantalum Polymer Capacitors," CARTS Europe 2008, Helsinki, Finland, Oct. 20-23, 2008.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.

* cited by examiner

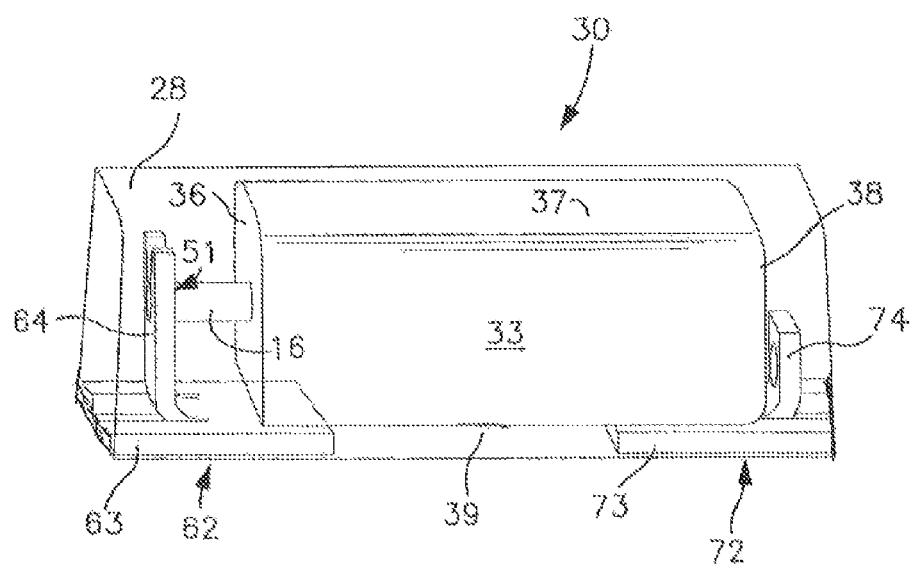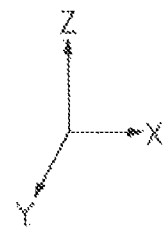

STABLE SOLID ELECTROLYTIC CAPACITOR CONTAINING A NANOCOMPOSITE

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a metal lead wire, sintering the pressed part, anodizing the sintered anode, and thereafter applying a solid electrolyte. The solid electrolyte layer may be formed from a conductive polymer (e.g., poly(3,4-ethylenedioxythiophene)), such as described in U.S. Pat. No. 5,457,862 to Sakata, et al., U.S. Pat. No. 5,473,503 to Sakata. et al., U.S. Pat. No. 5,729,428 to Sakata, et al., and U.S. Pat. No. 5,812,367 to Kudoh, et al. The conductive polymer electrolyte of these capacitors has traditionally been formed through sequential dipping into separate solutions containing the ingredients of the polymer layer. For example, the monomer used to form the conductive polymer is often applied in one solution, while the catalyst and dopant is applied in a separate solution or solutions. One problem with this technique, however, is that it is often difficult and costly to achieve a relatively thick solid electrolyte, which is helpful for achieving good mechanical robustness and electrical performance. Various attempts have been made to address this problem. U.S. Pat. No. 6,987,663 to Merker, et al., for instance, describes the use of a polymeric, outer layer that covers a surface of the solid electrolyte. Unfortunately, this technique is still problematic in that it is difficult to achieve good adhesion and mechanical robustness of the polymeric outer layer to the graphite/silver layer used in terminating the solid electrolyte capacitor.

As such, a need remains for a solid electrolytic capacitor that possesses good mechanical robustness and electrical performance.

SUMMARY OF THE INVENTION

In accordance with one embodiment of the present invention, a solid electrolytic capacitor is disclosed that comprises an anode body, a dielectric that overlies the anode body, and a solid electrolyte that overlies the dielectric. The solid electrolyte includes a nanocomposite that contains a plurality of nanofibrils dispersed within a conductive polymer matrix. The nanofibrils have a number average cross-sectional dimension of about 500 nanometers or less and an aspect ratio of from about 25 to about 500.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a schematic illustration of one embodiment of a capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that includes an anode body, dielectric overlying the anode body, and solid electrolyte that overlies the dielectric. The solid electrolyte includes a nanocomposite that contains a plurality of nanofibrils and a conductive polymer matrix. The nanofibrils may be dispersed within the matrix, or present in the nanocomposite as a separate layer. Regardless, the nanofibrils have a relatively small size and high aspect ratio, which the present inventors have discovered can dramatically improve the thermal-mechanical stability and robustness of the resulting capacitor. The nanofibrils may, for example, have a number average cross-sectional dimension (e.g., diameter) of about 500 nanometers or less, in some embodiments from about 1 to about 100 nanometers, and in some embodiments, from about 2 to about 40 nanometers. The nanofibrils may likewise have an aspect ratio (average length divided by average diameter) of from about 25 to about 500, in some embodiments from about 50 to about 300, and in some embodiments, from about 100 to about 200. The nanofibrils may, for example, have a number average length of from 0.1 to about 10 micrometers, in some embodiments from about 0.2 to about 5 micrometers, and in some embodiments, from about 0.5 to about 3 micrometers. The number average diameter and length may be determined by any technique known to a person skilled in the art, such as transmission electron microscopy ("TEM") coupled with a software image analysis technique.

Various embodiments of the present invention will now be described in more detail.

I. Nanocomposite

As indicated above, in certain embodiments of the present invention, the nanofibrils may be dispersed within the conductive polymer matrix. In other embodiments, the nanofibrils and conductive polymer matrix may be present as separate layers of the nancomposite. In such embodiments, the nanofibril layer may overlie the dielectric, and the conductive polymer matrix may overlie the nanofibril layer or be positioned between the dielectric and the nanofibril layer. Regardless, the relative amount of the nanofibrils in the nanocomposite may be selectively controlled to help achieve the desired mechanical properties without adversely impacting other properties. For example, the nanofibrils may constitute from about 0.5 wt. % to about 40 wt. %, in some embodiments from about 1 wt. % to about 30 wt. %, and in some embodiments, from about 5 wt. % to about 20 wt. % of the nanocomposite. The conductive polymer matrix may likewise constitute from about 60 wt. % to about 99.5 wt. %, in some embodiments from about 70 wt. % to about 99 wt. %, and in some embodiments, from about 80 wt. % to about 95 wt. % of the nanocomposite.

A. Nanofibrils

Any of a variety of nanofibrils having the characteristics noted above may generally be employed in the present invention. Examples of such nanofibrils may include, for instance, non-conductive nanofibrils, such as glass nanofibers, mineral nanoparticles (e.g., talc, mica, clay, alumina, silica, etc.), and so forth; conductive nanofibrils, such as carbon black, carbon nanotubes, carbon nanofibers, metal nanoplatelets, and so forth; as well as combination thereof. Conductive nanofibrils are particularly suitable to minimize the ESR of the resulting capacitor. In one particular embodiment, for instance, carbon nanotubes are employed in the nanocomposite. The term "carbon nanotube" generally refers to a nanostructure containing at least one layer of graphene in the shape of a hollow cylinder. The cylinder may be rolled at specific and discrete chiral angles and may be capped at one or both ends fullerene. The carbon nanotubes may contain only one graphene monolayer, in which case they are known as single-wall nanotubes ("SWNT"). The carbon nanotubes may also be a coaxial assembly of several single-wall nanotubes of different diameters, in which case they are generally known as multi-wall nanotubes (MWNT). Multi-wall nanotubes are particularly suitable for use in the present invention that include, for instance, from 2 to 100, and in some embodiments, from 5 to 50 coaxial single-wall nanotubes. Such multi-wall nanotubes are commercially available under the trade designation Nanocyl®. Nanocyl® NC210 and NC7000, for instance, are multi-walled nanotubes having average diameters of 3.5 nanometers and 9.5 nanometers, respectively (with lengths between 1 and 10 micrometers).

Any of a variety of known techniques may be employed to form the carbon nanotubes, such as catalytic carbon vapor deposition. Regardless, the resulting carbon nanotubes typically have a high carbon purity level to provide a more controlled and narrow size distribution. For example, the carbon purity may be about 80% or more, in some embodiments about 85% or more, and in some embodiments, from about 90% to 100%. If desired, the carbon nanotubes may optionally be chemically modified by functional groups to improve, for example, their hydrophilic character. Suitable functional groups may include, for instance, carboxyl groups, amine groups, thiol groups, hydroxy groups, etc.

B. Conductive Polymer Matrix

The conductive polymer matrix generally contains one or more conductive polymers. The conductive polymer(s) employed in the matrix are typically π-conjugated and have electrical conductivity after oxidation or reduction, such as an electrical conductivity of at least about 1 µS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

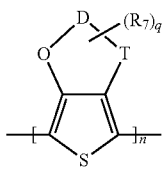

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

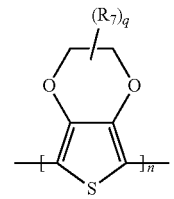

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

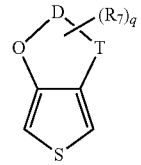

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

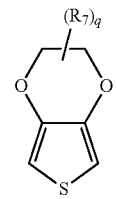

wherein, $R_7$ and q are as defined above. In one particular embodiment, "q" is 0. One commercially suitable example of 3,4-ethylenedioxthiophene is available from Heraeus Precious Metals GmbH & Co. KG under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Any of a variety of techniques may generally be employed to form the conductive polymer matrix. In one particular embodiment, for example, conductive polymer(s) may be polymerized in situ on the capacitor through chemical or electrochemical polymerization techniques, optionally in the presence of a dopant to help increase conductivity. For example, the monomer may be polymerized in the presence of a dopant that also has an oxidative capability in that it includes a cation (e.g., transition metal) and an anion (e.g., sulfonic acid). For example, the dopant may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Precious Metals GmbH & Co. KG under the designation Clevios™ C.

The monomer and dopant may be applied either sequentially or together to initiate the in situ polymerization reaction. Suitable application techniques for applying these components include screen-printing, dipping, electrophoretic coating, and spraying. As an example, the monomer may initially be mixed with a dopant to form a precursor solution. Once the mixture is formed, it may be applied to the anode part and then allowed to polymerize so that a conductive coating is formed on the surface. Alternatively, the dopant and monomer may be applied sequentially. In one embodiment, for example, the dopant is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

Besides in situ polymerization, the conductive polymer matrix may also be formed from a dispersion of pre-polymerized particles. One benefit of employing a dispersion is that it may minimize the presence of ionic species (e.g., $Fe^{2+}$ or $Fe^{3+}$) produced during conventional in situ polymerization processes. Thus, by applying the conductive polymer as a dispersion, the resulting capacitor may exhibit a relatively high breakdown voltage. The shape of the particles in the dispersion may vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion. Solvent(s) may likewise constitute from about 90 wt. % to about 99.9 wt. %, in some embodiments from about 95 wt. % to about 99.6 wt. %, and in some embodiments, from about 96 wt. % to about 99.5 wt. % of the dispersion. The nature of the solvent may vary depending on the intended method of application. In one embodiment, for example, water may be the primary solvent so that the dispersion is considered an "aqueous" dispersion. In such embodiments, water may constitute at least about 50 wt. %, in some embodiments at least about 75 wt. %, and in some embodiments, from about 90 wt. % to 100 wt. % of the solvent(s) used in the dispersion. In other embodiments, however, organic solvents (e.g., methanol, ethanol, acetone, 2-butanone, dimethylformamide, dimethylacetamide, N-methylpyrrolidone, etc.) may be employed in the dispersion. For example, organic solvents are the primary solvents employed and constitute at least about 50 wt. %, in some embodiments at least about 75 wt. %, and in some embodiments, from about 90 wt. % to 100 wt. % of the solvent(s) used in the dispersion.

The polymeric dispersion may also contain a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic.

Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, sulfonic acids such as described above. When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

The polymeric dispersion may be applied to the part using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPa·s (measured at a shear rate of 100 s$^{-1}$), in some embodiments from about 1 to about 10,000 mPa·s, in some embodiments from about 10 to about 1,500 mPa·s, and in some embodiments, from about 100 to about 1000 mPa·s. Once applied, the layer may be dried and washed.

Regardless of the manner in which the conductive polymer matrix is formed, any of a variety of techniques may be employed to incorporate the nanofibrils into the capacitor. For example, the nanofibrils may simply be added as an aqueous dispersion, and the conductive polymer matrix may thereafter be applied. Alternatively, the nanofibrils may be blended with the solution or dispersion used to form the polymer matrix. In one particular embodiment, the nanofibrils are blended with a dispersion containing pre-polymerized conductive polymer particles as described above. To aid in the application process, the nanofibrils may also be provided in the form a dispersion. In such embodiments, the nanofibrils typically constitute from about 0.1 to about 10 wt. %, in some embodiments from about 0.4 to about 5 wt. %, and in some embodiments, from about 0.5 to about 4 wt. % of the dispersion. Solvent(s) may likewise constitute from about 90 wt. % to about 99.9 wt. %, in some embodiments from about 95 wt. % to about 99.6 wt. %, and in some embodiments, from about 96 wt. % to about 99.5 wt. % of the dispersion. The nature of the solvent may vary as described above.

In one embodiment, for example, water may be the primary solvent so that the dispersion is considered an "aqueous" dispersion.

C. Other Components

In addition to nanofibrils and conductive polymer matrix, it should be also understood that the nanocomposite may optionally contain other components. In one embodiment, for example, a crosslinking agent may also be employed in the nanocomposite to enhance the degree of adhesion. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis (amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N', N'-tetramethylethylenediamine, N,N,N',N'-tetramethyl-1,4-butanediamine, etc., as well as mixtures thereof. The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied by any known process, such as spin-coating, impregnation, casting, dropwise application, spray application, vapor deposition, sputtering, sublimation, knife-coating, painting or printing, for example inkjet, screen or pad printing.

If desired, the nanocomposite may also contain a hydroxy-functional nonionic polymer. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to about 10,000 grams per mole, in some embodiments from about 200 to about 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—$OH$ (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H_6)_{1\text{-}25}$—$OH$; polyoxyethylene glycol octylphenol ethers having the following general formula: $C_8H_{17}$—$(C_6H_4)$—$(O$—$C_2H_4)_{1\text{-}25}$—$OH$ (e.g., Triton™ X-100); polyoxyethylene glycol alkylphenol ethers having the following general formula: $C_9H_{19}$—$(C_6H_4)$—$(O$—$C_2H_4)_{1\text{-}25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

II. Capacitor Construction

As indicated above, the nanocomposite of the present invention is generally incorporated into a solid electrolyte of a capacitor, which overlies an anode that contains an anode body and dielectric. The manner in which the nanocomposite is incorporated into the solid electrolyte may vary depending on the desired application. Nevertheless, various exemplary embodiments of the capacitor are described in more detail below.

A. Solid Electrolyte

The solid electrolyte of the capacitor may contain one or more conductive polymer layers, at least one of which contains the nanocomposite of the present invention. In one particular embodiment, for instance, the solid electrolyte may contain an inner conductive polymer layer and outer conductive polymer layer. The inner layer is designed to impregnate into the pores of the anode body, while the outer layer is designed to cover the edge region of the capacitor body, thereby increasing adhesion to the dielectric and resulting in a more mechanically robust part. It should be understood that the term "outer" as used herein simply means that the layer overlies the inner layer. Additional polymer layers may also be disposed over an outer layer or beneath the inner layer, as well as between an inner layer and an outer layer.

Regardless, the conductive polymer employed in at least one of the inner and outer layers is typically in the form of pre-polymerized particles, such as described above. In one embodiment, for example, the inner layer is formed by in situ polymerization of a monomer, but the outer layer is formed from pre-polymerized particles. In yet other embodiments, both layers are formed from pre-polymerized particles. To enable good impregnation of the anode body, the conductive polymer employed in the inner layer may have a relatively small size, such as an average size (e.g., diameter) of from about 1 to about 150 nanometers, in some embodiments from about 2 to about 50 nanometers, and in some embodiments, from about 5 to about 40 nanometers. Because it is generally intended to improve the degree of edge coverage, the particles used in the outer layer may have a larger size than those employed in the inner layer. For example, the ratio of the average size of the particles employed in outer layer to the average size of the particles employed in the inner layer is typically from about 1.5 to about 30, in some embodiments from about 2 to about 20, and in some embodiments, from about 5 to about 15. The particles employed in the dispersion of the outer layer may have an average size of from about 50 to about 500 nanometers, in some embodiments from about 80 to about 250 nanometers, and in some embodiments, from about 100 to about 200 nanometers. It should be understood that multiple inner and outer layers may be formed from the dispersions to achieve the target total thickness. For example, the total thickness of the inner layers formed is from about 0.1 to about 5 µm, in some embodiments from about 0.1 to about 3 µm, and in some embodiments, from about 0.2 to about 1 µm. Likewise, the total thickness of the outer layers may range from about 1 to about 50 µm, in some embodiments from about 2 to about 40 µm, and in some embodiments, from about 5 to about 20 µm.

If desired, intermediate layer(s) may also be employed between the inner and outer layers. In one embodiment, for example, an intermediate layer is employed that is formed from a dispersion of pre-polymerized particles in combination with a hydroxy-functional polymer, such as described above. In such embodiments, the inner layer and/or outer layer may be generally free of such hydroxy-functional nonionic polymers.

Regardless of its particular configuration, the nanocomposite of the present invention may generally be employed in any portion of the solid electrolyte. In certain embodiments, for example, the nanocomposite may be employed to form one or more of the outer layers of the solid electrolyte so that the desired mechanical robustness is achieved. Of course, it should be understood that the nanocomposite may also be employed in one or more of the inner layers, one or more of the intermediate layers, as well as combinations of such layers.

B. Anode

The anode body of the anode may be formed from a valve metal composition. The specific charge of the composition may vary, such as from about 2,000 μF*V/g to about 250,000 μF*V/g, in some embodiments from about 3,000 μF*V/g to about 200,000 μF*V/g or more, and in some embodiments, from about 5,000 to about 150,000 μF*V/g. As is known in the art, the specific charge may be determined by multiplying capacitance by the anodizing voltage employed, and then dividing this product by the weight of the anodized electrode body. The valve metal composition generally contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:10±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al, U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al.

To form the anode body, a powder of the valve metal composition is generally employed. The powder may contain particles any of a variety of shapes, such as nodular, angular, flake, etc., as well as mixtures thereof. Certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al. Thereafter, the porous body is sintered to form an integral mass. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

The resulting anode may have a relatively low carbon and oxygen content. For example, the anode may have no more than about 50 ppm carbon, and in some embodiments, no more than about 10 ppm carbon. Likewise, the anode may have no more than about 3500 ppm oxygen, in some embodiments no more than about 3000 ppm oxygen, and in some embodiments, from about 500 to about 2500 ppm oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

As noted above, an anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

A dielectric also overlies or coats the anode body. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

C. Other Layers

If desired, the capacitor may also contain other layers as is known in the art. For example, an adhesion layer may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1 \times 10^5$ Ω·cm, and in some embodiments, greater than about $1 \times 10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

D. Assembly

The capacitor may also be provided with terminations, particularly when employed in surface mounting applications. For example, the capacitor may contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIG. 1, one embodiment of an electrolytic capacitor 30 is shown that includes an anode termination 62 and a cathode termination 72 in electrical connection with a capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 and rear surface 38. More specifically, the cathode termination 72 contains a first component 73 positioned substantially perpendicular to a second component 74. The first component 73 is in electrical contact and generally parallel with the lower surface 39 of the capacitor element 33. The second component 74 is in electrical contact and generally parallel to the rear surface 38 of the capacitor element 33. Although depicted as being integral, it should be understood that these portions may alternatively be separate pieces that are connected together, either directly or via an additional conductive element (e.g., metal). Also, in certain embodiments, it should be understood that the second component 74 may be eliminated from the cathode termination 72. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. In the illustrated embodiment, the region 51 possesses a "U-shape" for further enhancing surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, a conductive adhesive may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 and the second component 74 of the cathode termination 72 are initially bent upward to the position shown in FIG. 1. Thereafter, the capacitor element 33 is positioned on the cathode termination 72 so that its lower surface 39 contacts the adhesive and the anode lead 16 is received by the upper U-shaped region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

Once the capacitor element is attached, the lead frame is enclosed within a resin casing, which may then be filled with silica or any other known encapsulating material. The width and length of the case may vary depending on the intended application. Suitable casings may include, for instance, "A", "B", "C", "D", "E", "F", "G", "H", "J", "K", "L", "M", "N", "P", "R", "S", "T", "V", "W", "Y", "X", or "Z", cases (AVX Corporation). Regardless of the case size employed, the capacitor element is encapsulated so that at least a portion of the anode and cathode terminations are exposed for mounting onto a circuit board. As shown in FIG. 1, for instance, the capacitor element 33 is encapsulated in a case 28 so that a portion of the anode termination 62 and a portion of the cathode termination 72 are exposed.

Regardless of the particular manner in which it is formed, the resulting capacitor may exhibit excellent electrical properties. The equivalent series resistance ("ESR") may, for instance, be about 1,200 milliohms or less, in some embodiments about 300 milliohms or less, in some embodiments about 200 milliohms or less, and in some embodiments, from about 1 to about 100 milliohms, as measured with a 2.2 volt DC bias and a 0.5 volt peak to peak sinusoidal signal, free of harmonics, at a frequency of 100 kHz. In addition, the leakage current, which generally refers to the current flowing from one conductor to an adjacent conductor through an insulator, can be maintained at relatively low levels. For example, the leakage current may be about 40 µA or less, in some embodiments about 25 µA or less, and in some embodiments, about 15 µA or less. The numerical value of the normalized leakage current of the capacitor may likewise be about 0.2 µA/µF*V or less, in some embodiments about 0.1 µA/µF*V or less, and in some embodiments, about 0.05 µA/µF*V or less, where µA is microamps and µF*V is the product of the capacitance and the rated voltage. The ESR and normalized leakage current values may even be maintained at relatively high temperatures. For example, the values may be maintained after reflow (e.g., for 10 seconds) at a temperature of from about 100° C. to about 350° C., and, in some embodiments from about 200° C. to about 300° C. (e.g., 240° C.).

The capacitor may also exhibit a relatively high "breakdown voltage" (voltage at which the capacitor fails), such as about 35 volts or more, in some embodiments about 50 volts or more, and in some embodiments about 60 volts or more. The capacitor can also exhibit a relatively high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor of the present invention, for instance, may exhibit a wet-to-dry capacitance percentage of about 50% or more, in some embodiments about 60% or more, in some embodiments about 70% or more, and in some embodiments, from about 80% to 100%.

The present invention may be better understood with reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may be 100 kHz and the temperature may be 23° C.±2° C.

Capacitance (CAP)

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Leakage Current (DCL)

Leakage current may be measured using a leakage test meter at a temperature of 23° C.±2° C. and at the rated voltage after a minimum of 60 seconds.

The stability were conducted at the reflow temperature. The ESR, CAP and DCL of an individual capacitor were recorded after each $1^{st}$, $2^{nd}$ and $3^{rd}$ reflow.

EXAMPLE 1

40,000 μFV/g tantalum powder was used to form anode samples. Each anode sample was embedded with a tantalum wire, sintered at 1500° C., and pressed to a density of 5.3 g/cm³. The resulting pellets had a size of 1.20×1.85×2.50 mm. The pellets were anodized to 75V in water/phosphoric acid electrolyte with conductivity 8.6 mS at temperature of 85° C. to form the dielectric layer. A conductive polymer coating was then formed by dipping the anodes into a butanol solution of iron(III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 6 times. Thereafter, the parts were dipped into a dispersed poly(3,4-ethylenedioxythiophene) having a solids content 2% and viscosity 20 mPa·s (Clevios™ K, H. C. Starck). Upon coating, the parts were dried at 125° C. for 20 minutes. This process was not repeated. Thereafter, the parts were dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times.

The parts were then dipped into a graphite dispersion and dried. Finally, the parts were dipped into a silver dispersion and dried. Multiple parts (250) of 10 μF/25V capacitors were made in this manner.

EXAMPLE 2

Capacitors were formed in the manner described in Example 1, except that using a different conductive polymer coating. More particularly, after coating with the dispersed poly(3,4-ethylenedioxythiophene), the parts were dipped into multi-wall nanotubes dispersed in a water mixture having a solids content 2% and viscosity of 1250 mPa·s (Aquacyl™, Nanocyl). Upon coating, the parts were dried at 125° C. for 20 minutes. This process was repeated 2 times. The parts were then dipped into a graphite dispersion and dried. Finally, the parts were dipped into a silver dispersion and dried. Multiple parts (250) of 10 μF/25V capacitors were made in this manner.

EXAMPLE 3

Capacitors were formed in the manner described in Example 1, except that using a different conductive polymer coating. More particularly, after coating with the dispersed poly(3,4-ethylenedioxythiophene), the parts were dipped into a dispersion that contained poly(3,4-ethylenedioxythiophene) having a solids content 2% and viscosity 160 mPa·s (Clevios™ K, H. C. Starck) and multi-wall nanotubes having a solids content 2% (Nanocyl). Upon coating, the parts were dried at 125° C. for 20 minutes. This process was repeated 8 times. The parts were then dipped into a graphite dispersion and dried. Finally, the parts were dipped into a silver dispersion and dried. Multiple parts (250) of 10 μF/25V capacitors were made in this manner.

The finished capacitors of Examples 1-3 were then tested for reflow stability characteristic. The median results of ESR, CAP and DCL are set forth below in Table 1, 2, and 3.

TABLE 1

Temperature Stability Characteristics (ESR[mΩ])

| | — | $1^{st}$ | $2^{nd}$ | $3^{rd}$ |
|---|---|---|---|---|
| Example 1 | 94.5 | 122.1 | 133.7 | 139.2 |
| Example 2 | 90.0 | 104.2 | 105.0 | 106.6 |
| Example 3 | 92.3 | 119.4 | 130.5 | 131.0 |

TABLE 2

Temperature Stability Characteristics (CAP[μF])

| | — | $1^{st}$ | $2^{nd}$ | $3^{rd}$ |
|---|---|---|---|---|
| Example 1 | 10.14 | 9.59 | 9.46 | 9.35 |
| Example 2 | 9.80 | 9.61 | 9.50 | 9.41 |
| Example 3 | 10.16 | 9.74 | 9.59 | 9.47 |

TABLE 3

Temperature Stability Characteristics (DCL[μA])

| | — | $1^{st}$ | $2^{nd}$ | $3^{rd}$ |
|---|---|---|---|---|
| Example 1 | 0.147 | 0.196 | 0.245 | 0.270 |
| Example 2 | 0.196 | 0.294 | 0.588 | 1.568 |
| Example 3 | 0.147 | 0.220 | 0.294 | 0.514 |

As indicated, the parts formed from multi-wall nanotubes had enhanced reflow stability of ESR.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising an anode body, a dielectric that overlies the anode body, and a solid electrolyte that overlies the dielectric, wherein the solid electrolyte contains an inner layer and an outer layer, wherein the outer layer includes a nanocomposite that contains a plurality of nanofibrils and a conductive polymer matrix, the nanofibrils having a number average cross-sectional dimension of about 500 nanometers or less and an aspect ratio of from about 25 to about 500, wherein the conductive polymer matrix contains pre-polymerized conductive polymer particles, wherein the inner layer comprises conductive polymer particles, and wherein a ratio of an average size of the pre-polymerized conductive polymer particles of the outer layer to an average size of conductive polymer particles of the inner layer is from about 1.5 to about 30.

2. The solid electrolytic capacitor of claim 1, wherein the nanofibrils have a number average cross-sectional dimension of from about 1 to about 100 nanometers.

3. The solid electrolytic capacitor of claim 1, wherein the nanofibrils having an aspect ratio of from about 50 to about 300.

4. The solid electrolytic capacitor of claim 1, wherein the nanofibrils have a number average length of from 0.1 to about 10 micrometers.

5. The solid electrolytic capacitor of claim 1, wherein the nanofibrils are non-conductive.

6. The solid electrolytic capacitor of claim 1, wherein the nanofibrils are conductive.

7. The solid electrolytic capacitor of claim 6, wherein the conductive nanofibrils include carbon nanotubes.

8. The solid electrolytic capacitor of claim 7, wherein the carbon nanotubes are multi-wall carbon nanotubes.

9. The solid electrolytic capacitor of claim 1, wherein the nanofibrils and the conductive polymer matrix form separate layers of the nanocomposite.

10. The solid electrolytic capacitor of claim 1, wherein the nanofibrils are dispersed within the conductive polymer matrix.

11. The solid electrolytic capacitor of claim 1, wherein the conductive polymer is poly(3,4-ethylenedioxythiophene).

12. The solid electrolytic capacitor of claim 1, wherein the outer layer contains pre-polymerized conductive polymer particles having an average size of from about 100 to about 500 nanometers.

13. The solid electrolytic capacitor of claim 1, wherein the nanocomposite further comprises a crosslinking agent.

14. The solid electrolytic capacitor of claim 1, wherein the anode body is formed from a powder that contains tantalum, niobium, or an electrically conductive oxide thereof.

15. The solid electrolytic capacitor of claim 1, further comprising an anode termination that is in electrical connection with the anode body and a cathode termination that is in electrical connection with the solid electrolyte.

16. The solid electrolytic capacitor of claim 15, wherein an anode lead extends from the anode body and is connected to the anode termination.

17. A method for forming the solid electrolytic capacitor of claim 1, the method comprising applying the nanofibrils over the dielectric and thereafter applying a dispersion of pre-polymerized conductive polymer particles.

18. The method of claim 17, wherein the nanofibrils are in the form of an aqueous dispersion.

* * * * *